United States Patent [19]
Moslehi

[11] Patent Number: 5,506,672
[45] Date of Patent: Apr. 9, 1996

[54] SYSTEM FOR MEASURING SLIP DISLOCATIONS AND FILM STRESS IN SEMICONDUCTOR PROCESSING UTILIZING AN ADJUSTABLE HEIGHT ROTATING BEAM SPLITTER

[75] Inventor: Mehrdad M. Moslehi, Dallas, Tex.

[73] Assignee: Texas Instruments Incorporated, Dallas, Tex.

[21] Appl. No.: 118,944

[22] Filed: Sep. 8, 1993

[51] Int. Cl.⁶ .............................. G01L 1/24; G01B 11/00
[52] U.S. Cl. ........................................... 356/359; 356/360
[58] Field of Search ................................. 356/359, 363, 356/360, 357, 35.5

[56]  References Cited

U.S. PATENT DOCUMENTS

| | | | |
|---|---|---|---|
| 4,298,283 | 11/1981 | Makosch et al. | 356/351 |
| 4,353,650 | 10/1982 | Sommargren | 356/360 |
| 5,017,011 | 5/1991 | Lisson et al. | 356/363 |
| 5,094,536 | 3/1992 | MacDonald et al. | 356/359 |
| 5,156,461 | 10/1992 | Moslehi et al. | 374/121 |
| 5,159,408 | 10/1992 | Waldenmaier et al. | 356/359 |
| 5,202,748 | 4/1993 | MacDonald et al. | 356/363 |
| 5,232,547 | 8/1993 | Drowley et al. | 356/359 |
| 5,293,215 | 3/1994 | Pfendler et al. | 356/359 |

Primary Examiner—Samuel A. Turner
Assistant Examiner—Jason D. Eisenberg
Attorney, Agent, or Firm—Carlton H. Hoel; W. James Brady; Richard L. Donaldson

[57]  ABSTRACT

A system (22) is provided for measuring warpage, film stress, and slip dislocations in a semiconductor wafer (10), which includes a laser source (24) for generating a primary laser beam. At least one beam splitter (26) splits the primary laser beam into at least first and second beams, the first beam is directed to a first point of wafer surface, and the second beam is directed to a second point of the wafer surface. The at least one beam splitter (26) is further operable to combine a portion of the first beam after reflection from the first point of wafer surface and a portion of the second beam after reflection from the second point of the wafer surface into at least one composite beam for interferometric beam fringe pattern analysis.

8 Claims, 6 Drawing Sheets

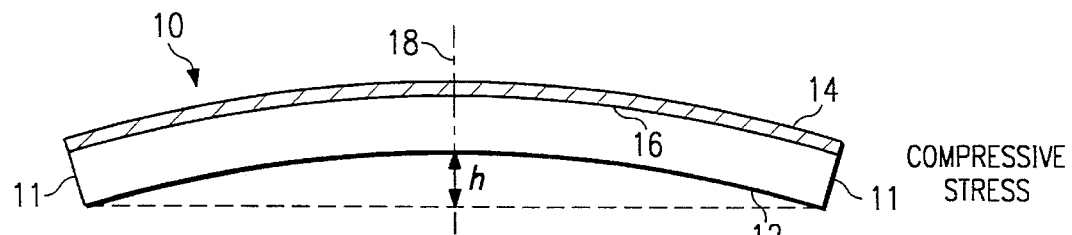
FIG. 1a
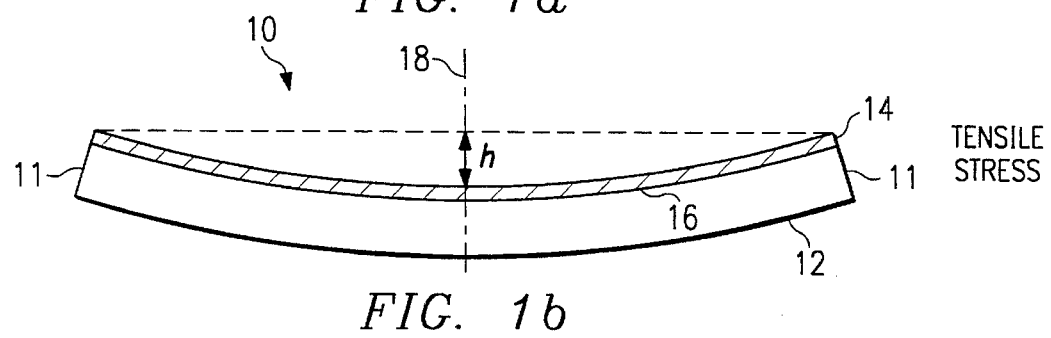
FIG. 1b
FIG. 2
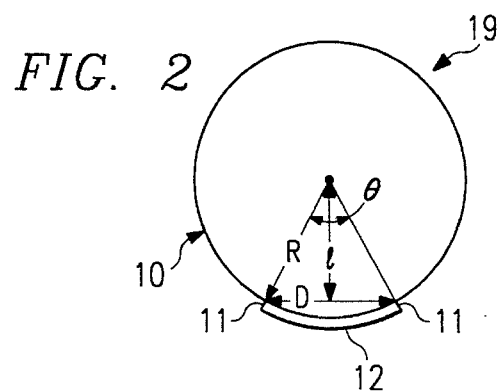
FIG. 3
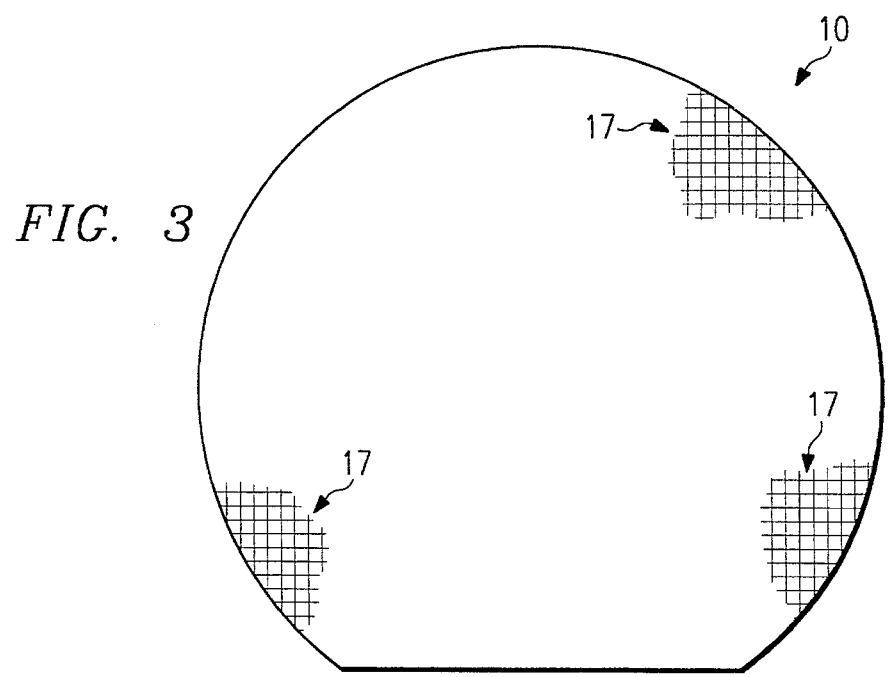

5,506,672

SYSTEM FOR MEASURING SLIP DISLOCATIONS AND FILM STRESS IN SEMICONDUCTOR PROCESSING UTILIZING AN ADJUSTABLE HEIGHT ROTATING BEAM SPLITTER

TECHNICAL FIELD OF THE INVENTION

The present invention relates in general to semiconductor device manufacturing, and in particular to methods, systems, and apparatus for in-situ measurements of slip dislocation patterns and film stress.

BACKGROUND OF THE INVENTION

Stress in thin layers of dielectrics, metals, and other thin material layers deposited on a semiconductor wafer is an important parameter in semiconductor device fabrication. Thin film stress can result in warpage of the wafer which can affect device performance, reliability, and line-width control during various microlithographic patterning steps. In extreme cases, the warpage resulting from thin film stress can present problems in securing and handling the wafer during device processing.

Additionally, various high temperature (e.g. above 850° C.) processes such as rapid thermal processing (RTP), epitaxial growth, thermal oxidation, thermal annealing, and some low-pressure chemical-vapor deposition (LPCVD) processes can result in the formation of slip dislocation lines on the wafer surface, mostly at the wafer edge. The slip dislocations are the result of crystal dislocations in the semiconductor substrate due to temperature non-uniformities causing thermally induced mechanical stresses. Such slip dislocations can reduce device fabrication yield and interfere with microlithography process steps. It is important to have in-situ measurement capability to characterize and quantify stress and slips in order to optimize process/equipment parameters.

Available systems for evaluating thin film stress usually employ a laser beam to measure the wafer warpage (radius of curvature) in order to extract thin film stress values. These systems, however, usually rely on large optical components requiring the systems to be separate from the semiconductor processing equipment. These systems, therefore, cannot be used for in-situ sensing and measurement applications such as those desired for semiconductor manufacturing equipment and process/equipment control and diagnostics. These stress measurement systems are also rather expensive and have been designed exclusively as ex-situ stand-alone measurement and inspection tools. Moreover, the available stress measurement tools only provide an average film stress value for the entire wafer surface and do not provide information on stress distribution.

X-ray topography has been the primary semiconductor characterization technique used for slip dislocation mapping. X-ray topography, however, is an ex-situ material evaluation technique which requires removing the wafer from the semiconductor process equipment. X-ray topography systems are, therefore, ex-situ off-line tools which cannot provide real time in-situ slip dislocation mapping information. X-ray topography systems are also rather expensive. Moreover, x-ray exposure can result in generation of defects in device structure which can cause accelerated aging and poor reliability.

SUMMARY OF THE INVENTION

Therefore, a need has arisen for a low-cost, noninvasive, in-situ sensor for slip dislocation mapping and stress measurement. A system for measuring both the thin film stress and slip dislocations, as well as their distribution maps, in a semiconductor wafer is provided which includes a laser source for generating a primary laser beam. At least one beam splitter splits the primary incident laser beam into at least first and second beams, the first beam directed to and from a first point of the wafer surface. The second beam is directed to and from a second point on the wafer surface. At least one beam splitter is further operable to combine a portion of the first beam after reflection from the first point of the wafer surface and a portion of the second beam after reflection from the second point of the wafer surface into at least one composite beam for interferometric fringe pattern analysis. Mirrors (reflectors) or fiber optics can be used to direct the beams throughout the system.

Apparatus, systems, and methods for stress measurement and slip dislocation mapping embodying the principles of the present invention have significant technical advantages over those currently available. Embodiments of the present invention provide for low cost, in-situ measurements of thin film stress and slip dislocations in a semiconductor wafer. The sensor of the present invention provides a technical advantage of being compatible with existing semiconductor processing equipment, such as rapid thermal processing and chemical-vapor deposition systems. Furthermore, the need for large optical components, which make current laser-based techniques unsuitable and impractical for low-cost, in-situ stress measurements, has been substantially eliminated.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1a and 1b are enlarged side views of a semiconductor wafer with convex and concave curvatures, respectively;

FIG. 2 depicts a side cross-sectional view of a curved semiconductor wafer, along with an extended imaginary circle representing the radius of curvature;

FIG. 3 depicts a top-down view of a semiconductor wafer with visible slip dislocations at localized regions near the wafer edge;

DETAILED DESCRIPTION OF THE INVENTION

Figure 4:
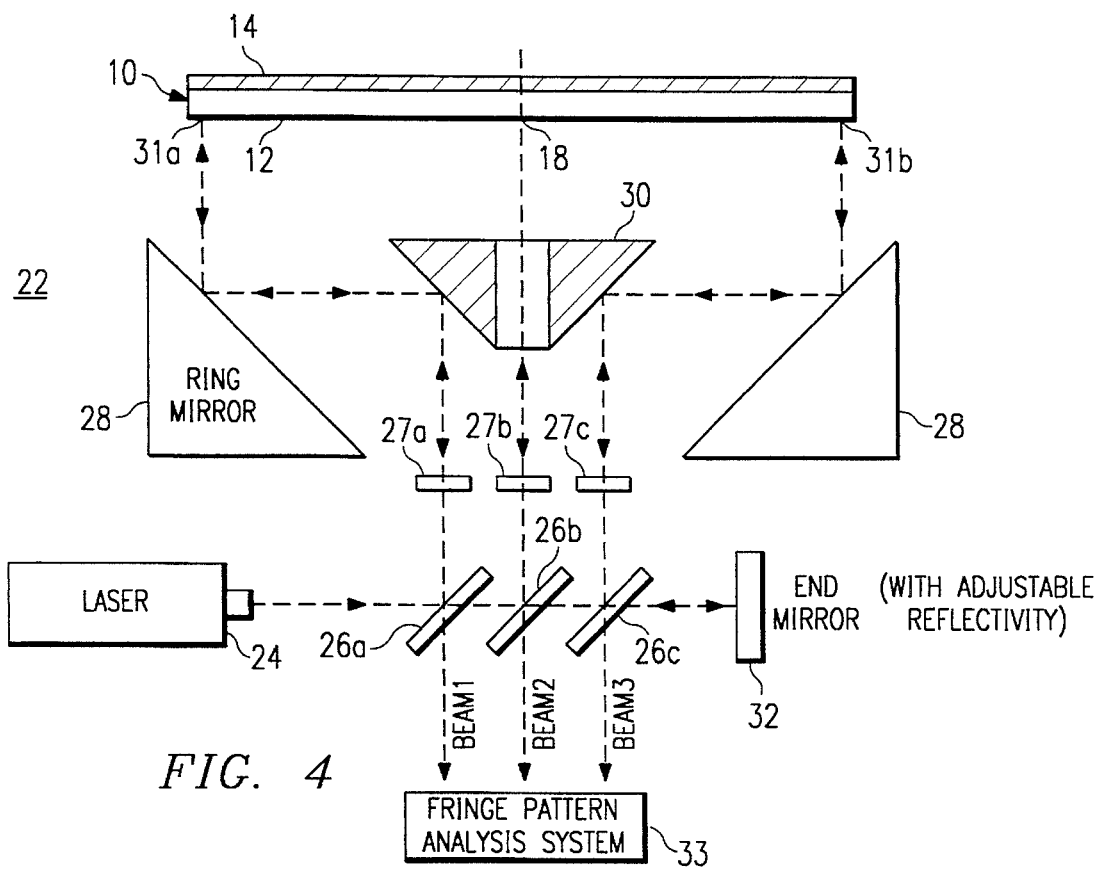
FIG. 4 is a schematic diagram of a stress measurement and slip dislocation mapping sensor system of the present invention employing three incident laser beams for interferometric fringe pattern analysis.

The preferred embodiment of the present invention and its advantages are best understood by referring to the FIGURES, like numerals being used for like and corresponding parts of the various drawings.

FIGS. 1a and 1b are two enlarged side views of semiconductor wafer 10. Wafer 10 includes silicon substrate 12 with thin material film 14 formed on polished upper surface 16. The edge of wafer 10 is indicated generally at 11. Depending on the nature of the mechanical stresses resulting from film 14, the wafer warpage of wafer 10 can be either convex shape due to compressive stress (FIG. 1a) or concave shape due to tensile stress (FIG. 1b). The level difference (wafer warpage) h in microns is determined by the amount of film stress, film thickness, and substrate thickness. For a typical 150-mm diameter silicon wafer 10, the substrate thickness 12 may be on the order of 500–600 μm. For a given film stress and film thickness, the amount of wafer warpage h increases with reducing substrate 12 thickness. For a standard 150-mm diameter wafer 10 with material film 14, with either dielectric, metal or strained heterostructures in film 14, the wafer warpage h can be as large as a few micrometers (μm).

Wafer curvature h due to thin film stress on wafer substrate 12 can be described by Equation (1):

$$\sigma_f = \frac{E_s}{6(1-v_s)} \frac{t_s^2}{t_f} \frac{1}{R} \quad (1)$$

where:

$\sigma_f$ is the thin film stress;

$E_s$ is Young's modules for substrate 12;

$v_s$ is Poisson's ratio for substrate 12;

$t_s$ is the thickness of substrate 12;

$t_f$ is the thickness of film 14; and

R is the radius of curvature of substrate.

Within Equation (1) is the composite elastic constant term represented by Equation (2):

$$\frac{E_s}{1-v_s} = 1.805 \times 10^{12} \text{ dynes/cm}^2, \quad (2)$$

assuming silicon substrate 12 has a <100> crystal orientation. This composite elastic term is constant for any direction within the <100> plane of silicon substrate 12.

Referring next to FIG. 2, the edge-to-center level difference (wafer warpage) h of wafer 10 can be described in terms of the radius of curvature R (of extended circle of Equation (1) according to the following derivation. Since, based on FIG. 2:

$$l = \sqrt{R^2 - \frac{D^2}{4}} \quad (3)$$

and $$l = R - h \quad (4)$$

then, $$h = R - \sqrt{R^2 - \frac{D^2}{4}} \quad (5)$$

From the trigonometric relationships of Equations (6) and (7):

$$\theta = \frac{D}{2\pi R} \; 360° = \frac{D}{R} \text{ radians} \quad (6)$$

and $$\cos\left(\frac{\theta}{2}\right) = \frac{l}{R} = \frac{R-h}{R} = 1 - \frac{h}{R} \quad (7)$$

Therefore, wafer warpage h can be expressed as:

$$h = R\left[1 - \cos\left(\frac{D}{2R}\right)\right] \quad (8)$$

Then, using the trigonometric identity:

$$\cos x \cong 1 + \frac{x^2}{2}(-1) = 1 - \frac{x^2}{2} \quad (9)$$

Equation (8) can be reduced to:

$$h \cong R\left[1 - 1 + \frac{D^2}{8R^2}\right] \quad (10)$$

and finally resulting in $$h = \frac{D^2}{8R} \quad (11)$$

Substituting for R in Equation (1) using Equation (11) gives:

$$\sigma_f = \frac{E_s}{6(1-v_s)} \frac{t_s^2}{t_f} \frac{8h}{D^2} \quad (12)$$

or $$\sigma_f = \frac{4}{3}\left(\frac{E_s}{(1-v_s)}\right)\left(\frac{t_s}{D}\right)^2\left(\frac{h}{t_f}\right) \quad (13)$$

As an example, assume the thin film stress $\sigma_f$ for 150 mm diameter wafer 10 is $5 \times 10^9$ dynes/cm$^2$, thin film 14 thickness $t_f$ is 95 angstroms (9.5 nm) of oxide (grown at 800° C.), and substrate 12 thickness $t_s$ is 500 μm or 0.5 mm. Then substituting these values into Equation (13) gives:

$$5 \times 10^9 = \frac{4}{3}(1.805 \times 10^{12})\left(\frac{0.5}{150}\right)^2 \frac{h}{t_f} \quad (14)$$

Therefore, solving Equation (14) gives:

$$h/t_f \cong 187 \rightarrow h = 187 \; t_f \quad (15)$$

With film 14 thickness $t_f$ of 95 angstroms, wafer warpage h becomes 1.776 μm. In other words, the wafer warpage (center to edge displacement) h will be approximately 1.776 micrometers. For thicker films 14, the amount of center to edge displacement h may be on the order of tens of micrometers.

FIG. 3 is a top or bottom view of wafer 10 showing some visible slip dislocations 17. Slip dislocations 17 which may or may not be visible to the human eye, are the result of various high temperature processes which can cause excessive thermally induced mechanical stresses. As detailed above, it is desirable to know the location and quantity of all slip dislocations on wafer 10 as wafer 10 is undergoing numerous semiconductor device fabrication processes.

FIG. 4 is a schematic diagram of one embodiment of stress measurement and slip dislocation mapping sensor system 22 embodying the concepts of the present invention. System 22 can be used for either thin-film stress measurement or slip dislocation mapping (as well as wafer warpage measurements) on a wafer, or can perform both stress measurement and slip dislocation mapping simultaneously. In this embodiment, wafer 10 is being held face up in a vacuum load-lock or metrology chamber (explicitly not shown) with system 22 located below wafer 10. If desired, the system may also be used with a face-down wafer. By positioning wafer 10 with substrate 12 backside facing system 22, device pattern effects on the incident laser beams can be eliminated. It should be noted that wafer 10 can be positioned with film 14 (or wafer frontside) facing system 22 without affecting the inventive concepts of system 22. System 22 includes a suitable laser source 24 which provides a primary beam of a suitable wavelength, which may be, for example, 0.85 μm, 1.30 μm, 1.55 μm, 10.6 μm or 6328 Å, or in general, a wavelength in the range of 400 nm to over 10 μm.

In this embodiment, the primary beam provided by laser source 24 is split into three secondary incident beams by three corresponding beam splitters 26a, 26b, and 26c. A portion of the primary beam not redirected by the beam splitters is reflected (or partially reflected) by end mirror 32 providing a reference beam. The beam incident to beam splitter 26b generates an axial beam which is sent directly to center or a near-center point 18 of wafer 10. The two other secondary beams, in this case the beams generated by incident beam splitters 26a and 26c, are directed toward two edge (or two off-center) points of wafer 10 via cone shaped ring mirror 28 and cone shaped ring mirror 30. It should be noted that in alternate embodiments, cone-shaped mirror 30 can be replaced with flat mirrors. It should also be noted that the principles of the present invention can be applied to systems where only a single beam or more than two beams are directed toward the edges (or off-center points) of wafer 10.

The incident split beams are reflected off wafer 10. Presence of slip dislocation lines on the wafer at the beam/wafer interface points will cause laser beam scattering and reduced reflected specular beam intensity values. Moreover, wafer warpage (caused by thin film stress or thermal processing) changes the effective optical path length of one or more reflected beams, resulting in changes in the interferometric beam intensity values (after the reflected beams are combined together or with the initial incident beams). The reflected beams from center point 18 and edge (or off-center) points 31a and 31b of wafer 10 travel back essentially along the same paths as the split incident beams toward beam splitters 26a–c. Optional beam shutter/absorbers 27a, 27b, and 27c with adjustable coefficients may be used along the paths of incident and reflected split beams to vary the relative intensities of the beams. After beam splitter 26a, the reflected beam from reflection point 31a interferes with the reflected primary beam from end mirror 32 thereby generating an interferometric beam shown as BEAM1. BEAM1 contains the interferometric fringe pattern data resulting from the reflected beam from edge (or off-center) point 31a and the reference incident beam reflected back from end mirror 32. In a similar manner, interferometric beams represented by BEAM2 and BEAM3 of FIG. 4 are generated. BEAM3 contains the interferometric fringe pattern data for the edge (or off-center) point 31b and the reference incident beam reflected back from end mirror 32, and BEAM2 contains the interferometric fringe pattern for the reflected center beam and reference incident beam from end mirror 32.

By using at least two beams from two edge (or off-center) points 31a and 31b on wafer 10, any measurement errors due to wafer 10 having a slight tilt from the horizontal plane perpendicular to the optical axis of the sensor system 22 are cancelled. This can be done, for example, by a direct comparison of the interferometric fringe patterns taken from the edge (or off-center) points 31a and 31b.

Interferometric beams BEAM1, BEAM2, and BEAM3 containing the interferometric fringe pattern data are analyzed by fringe pattern analysis system 33. Fringe pattern analysis system 33 can extract both the wafer warpage h resulting from thin film stresses (and/or thermal stress history) in wafer 10 as well as the complete map of all slip dislocations in wafer 10. Fringe pattern analysis system 33 uses well known interferometry analysis algorithms to detect and map both warpage and slip dislocations in wafer 10. A full description of interferometry analysis algorithms is not warranted as such algorithms are not within the inventive concept of the present invention. It is sufficient to state that in such algorithms, warpage h of wafer 10 appears as a change in the DC (or low-frequency) signals representing the amplitude of the interferometric beams. As the warpage of wafer 10 increases or decreases, the amplitude of the interferometric beams will be affected due to the constructive or destructive beam interference effects caused by changes in the effective optical path lengths for one or more of the reflected beams. Thus, the increase or decrease in wafer warpage affects the DC (ow low-frequency) amplitude for the interferometric beam.

Slip dislocations are detected as a disturbance of the AC (high-frequency) signals superimposed over the interferometric beam amplitudes during wafer scanning. The AC disturbance effects observed in the interferometric beam amplitudes are caused by transient scattering of the incident laser beam impinging directly on a slip dislocation line.

In order to better understand the fringe pattern analysis system 33, a simple theoretical analysis of the interferometric beams BEAM1, BEAM2, and BEAM3 is presented here. When received by the fringe pattern analysis system 33, these beams can be expressed as Equations (16)–(18) respectively as follows:

$$E_{B1} = \alpha_{i1} \cos(\omega t + \phi_{O1}) + \beta_1 \cos(\omega t + \psi_1) \text{ off-center (BEAM 1)} \quad (16)$$

$$E_{B2} = \alpha_{i2} \cos(\omega t + \phi_{O2}) + \beta_2 \cos(\omega t + \psi_2) \text{ center (BEAM 2)} \quad (16)$$

$$E_{B3} = \alpha_{i3} \cos(\omega t + \phi_{O3}) + \beta_3 \cos(\omega t + \psi_3) \text{ off-center (BEAM 3)} \quad (17)$$

where, $E_{B1}$, $E_{B2}$, and $E_{B3}$ are the optical electric field functions of beams BEAM1, BEAM2, and BEAM3, respectively.

$\omega$ is the angular optical frequency of the laser source beam.

t is time $\alpha_{i1}$, $\alpha_{i2}$, and $\alpha_{i3}$ are the peak electric field amplitudes of the reference laser beams (due to reflections from end mirror 32 and subsequently from beam splitters 26a, 26b, and 26c, respectively). $\phi_{O1}$, $\phi_{O2}$, and $\phi_{O3}$ are the fixed optical phase angles associated with the three above-mentioned reference laser beams. $\beta_1$, $\beta_2$, and $\beta_3$ are the peak electric field amplitude, of the three reflected laser beams (from first off-center point, center point, and second off-center point of the wafer, respectively). These values also depend on the specular reflectivity of the wafer as well as the transmission coefficients of beam splitters $26a$, $26b$ and $26c$ and attenuators $27a$, $27b$, $27c$. $\psi_1$, $\psi_2$, and $\psi_3$ are the interferometric phase angles of the three above-mentioned reflected laser beams. These phase angles are associated with the effective optical path lengths of the reflected beams and, therefore, are affected by the wafer warpage and/or thin film stress.

As indicated in Equations (16)–(18) for $E_{B1}$, $E_{B2}$, and $E_{B3}$, the electric field amplitudes can experience constructive or destructive interference effects (corresponding to increased or reduced electric field amplitudes) depending on the relative phase difference values ($\psi_1-\phi_{O1}$, $\psi_2-\phi_{O2}$, and $\psi_3-\phi_{O3}$). Thus, fringe pattern analysis system 33 can simply use three photodetectors (not explicitly shown) to measure the intensities of the interferometric beams BEAM1, BEAM2, and BEAM3 (the beam intensities are proportional to $|E_{B1}|^2$, $|E_{B2}|^2$, and $|E_{B3}|^2$. The measured beam intensity values can be fed to a computer in fringe pattern analysis system 33 via analog-to-digital converters (also with system 33) for digital signal processing in order to extract the warpage and slip dislocation map data. The beam intensity data are collected for area scans of the wafer surface in order to extract the stress and slip dislocation maps. The intensity data contains the necessary information related to the stress and slip distribution data. The signal processing algorithm in the computer can easily extract the wafer warpage (displacement with respect to center) versus position from the wafer center based on simple analytical interferometric equations. The slip dislocation map is obtained simply based on the high-frequency (so called AC) component of the collected signals versus time.

Figure 5:
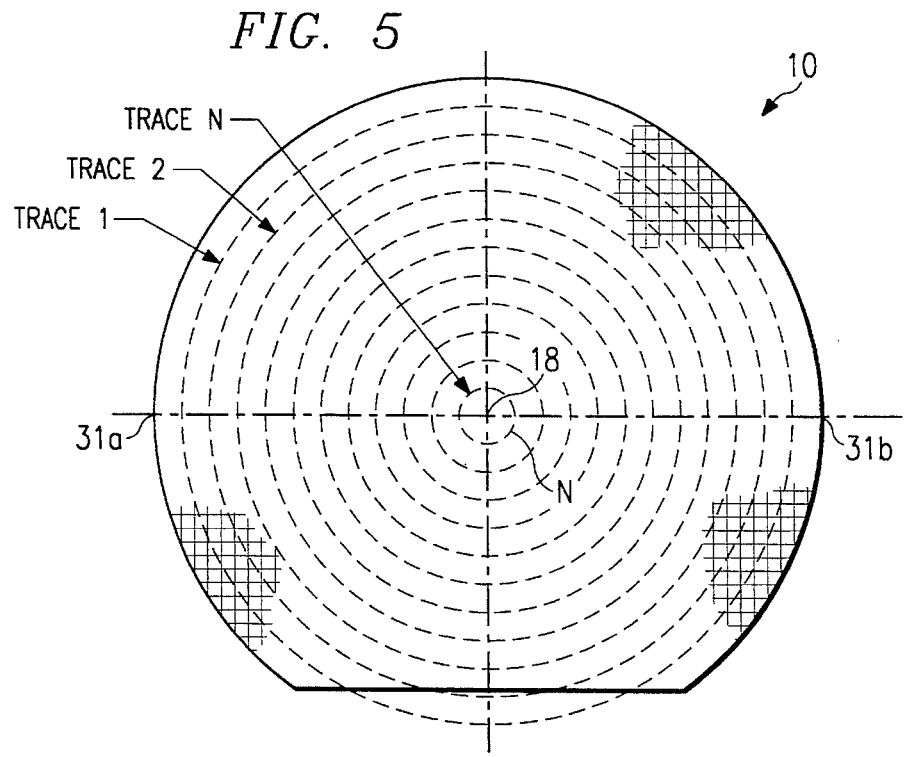
FIG. 5 depicts a top-down view of the semiconductor wafer of FIG. 3 with example scanning traces for measurements of slip dislocation and stress maps.

In order to obtain full maps of both stress and slip dislocations of wafer 10, the beams incident over the off-center points must be traced over a full circumference of wafer 10 at various radial positions. This requires that either wafer 10 or parts of system 22 directing the incident beams be rotated as well as be moved in the axial direction. After each full circular scan over a full circumference of the wafer 10, mirror 30 is moved along an axis perpendicular to wafer 10 so as to change the radius of the scanning circumference upon which the off-center point beams are traced. FIG. 5 depicts a possible scanning pattern for wafer 10. By either rotating wafer 10 or system 22 (or parts thereof), and moving mirror 30, the entire front or back surface of wafer 10 can be scanned for both stress and slip dislocations. The scanning of wafer 10 can include as many traces as desired. The scanning methodology depicted in FIG. 5 begins with Trace 1 all the way around the circumference of wafer 10. Once Trace 1 is completed, mirror 30 is again adjusted to direct the incident beams on Trace 2. This process is repeated all the way on to Trace N.

Figure 6:
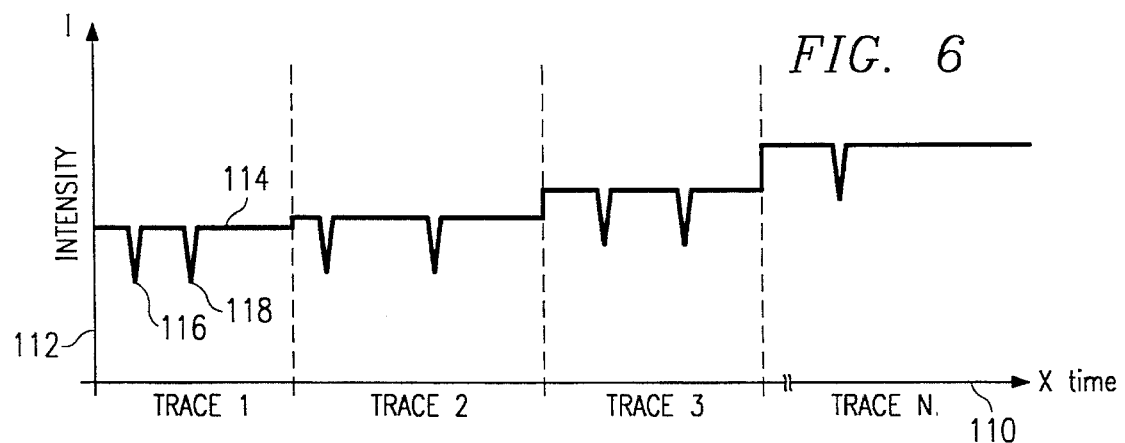
FIG. 6 depicts a qualitative relationship between interferometric laser beam intensity and scanning trace position during scanning of a semiconductor wafer.

FIG. 6 depicts a representative qualitative plot of the interferometric beam intensity of one of the interferometric beams as seen by a detector during slip dislocation scanning with system 22 of a semiconductor wafer similar to wafer 10. Horizontal axis 110 represents the mapping time and vertical axis 112 represents the intensity of one of the interferometric beams (for example, BEAM1). During Trace 1 of wafer 10 mapping, the signal has an intensity level represented by level 114. Downward spikes 116 and 118 represent AC disturbances to the signal level 114 resulting when the off-center incident beam strikes a slip dislocation on wafer 10 and the incident beam is scattered. Spikes 116 and 118 may also be upward. This will result in attenuation of the corresponding off-center reflected specular beam. Similar spikes may occur as the scanning of the wafer continues to Trace 2 and onto Trace N, whenever the beam impinges on a slip dislocation line.

Figure 7:
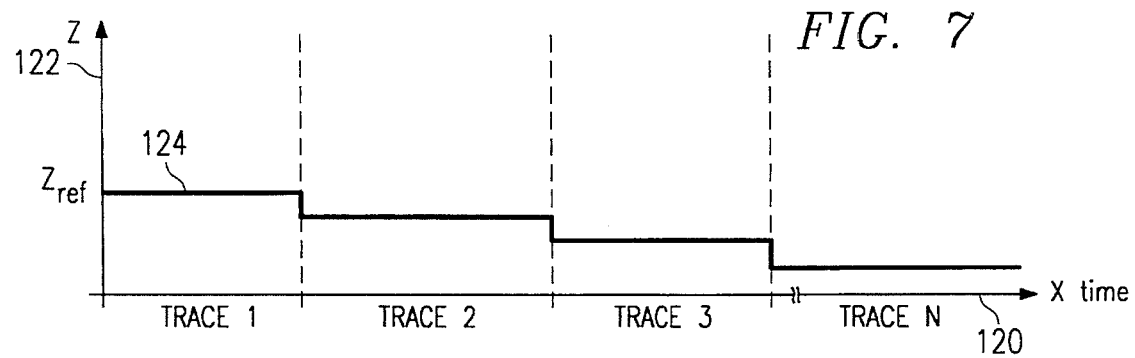
FIG. 7 depicts a representative relationship between a mirror axial position "Z" and the scanning trace position for full wafer mapping.

FIG. 7 is indicative of a plot depicting a typical full wafer scan by a combination of circular scans and stepping of the radial positions of the incident off-center laser beams by stepping of the axial position of cone shaped mirror 30. Horizontal axis 120 is the same as described for FIG. 6. Z-axis 122 represents the relative position of, for example, the cone-shaped mirror 30 of FIG. 4 with respect to the wafer surface. Example plot 124 is indicative of a combined circular/radial scanning routine to be used for a full-wafer map as shown in FIG. 5. Therefore, as the scanning traces progress from the outermost trace, Trace 1, to the inner most trace, Trace N, interferometric beam intensity data are collected over all these traces to construct a full wafer map. These measurements can be used to calculate stress and warpage of wafer 10 in accordance with the formulas derived above. They can also be used to construct a complete map of all the slip dislocation lines over the wafer surface. It should be noted that FIGS. 6 and 7 are only example plots for slip dislocation detection and stress measurement of a semiconductor wafer available with the system of the present invention.

Figure 8:
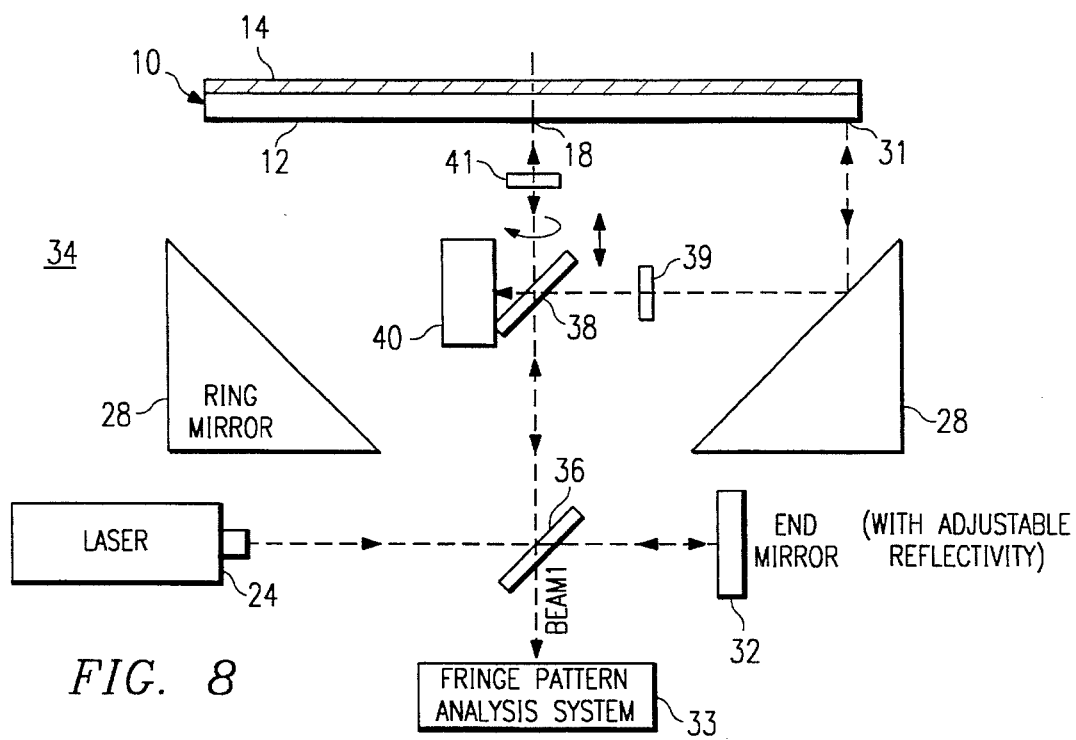
FIG. 8 is a schematic diagram of an embodiment of the stress measurement and slip dislocation mapping sensor system of the present invention employing an adjustable height rotating beam splitter and a single incident laser beam for interferometric fringe pattern analysis.

To show a possible alternative design, FIG. 8 depicts stress measurement and slip dislocation mapping system 34 embodying the concepts of the present invention. System 34 operates on the same principals as system 22 of FIG. 4. In the embodiment of system 34, laser source 24 provides a primary incident beam to a single fixed beam splitter 36. A portion of the primary beam incident on beam splitter 36 passes to end mirror 32 (which has an adjustable reflectivity between zero and one) while a second portion is directed towards an adjustable height rotating beam splitter 38. A portion of the beam incident on beam splitter 38 passes to center point 18 of wafer 10 while a second portion is directed to edge or off-center point 31 on wafer 10 via cone-shaped ring mirror 28. Wafer 10 may be held face up in a vacuum load lock or metrology chamber with substrate 12 backside facing system 34. However, wafer 10 can also be oriented to have frontside film 14 facing sensor system 34 without affecting the inventive concept.

A fraction of the reflected beam from center point 18 of wafer 10 and a portion of the reflected beam from edge or off-center point 31 on wafer 10 are combined by beam splitter 38. The remaining portion of the reflected beam from edge or off-center point 31 is passed to blackbody absorber 40 and absorbed. The combined reflected beam then travels to beam splitter 36 where it combines with the reflected reference beam from mirror 32. The resulting interferometric beam, BEAM1, is used to detect and quantify warpage of wafer 10 as well as detect slip dislocations in wafer 10 by interferometric analysis in fringe pattern analysis system 33. If desired, an optional shutter/absorber 39 may be used to block or attenuate the off-center reflected beam. Similarly, an optional shutter/absorber 41 may be used to block or attenuate the center reflected beam. These shutter/absorber elements can be controlled via control signals sent by system 33 such that during real-time scanning, the resultant BEAM1 becomes an interferometric combination of: the center reflected beam and the reference beam from the end mirror 32; or the off-center reflected beam and the reference beam from the end mirror 32; or both the center and off-center reflected beams as well as the reference beam from the end mirror 32. One or more of these interferometric arrangements may be used to extract the wafer warpage, thin film stress, and slip dislocation maps. Using rotating and adjustable height beam splitter 38, absorber 40, and optional shutter/absorber 39 the entire surface of wafer 10 can be scanned as shown by rotating beam splitter 38 (as well as absorber 40 and shutter/absorber 39) relative to the surface of wafer 10 and moving beam splitter 38 (as well as absorber 40 and shutter/absorber 39) in a plane perpendicular to wafer 10. The above-mentioned rotation and axial movement allow for tracing the entire surface of wafer 10 and obtaining example traces as shown in FIG. 5.

Figure 9:
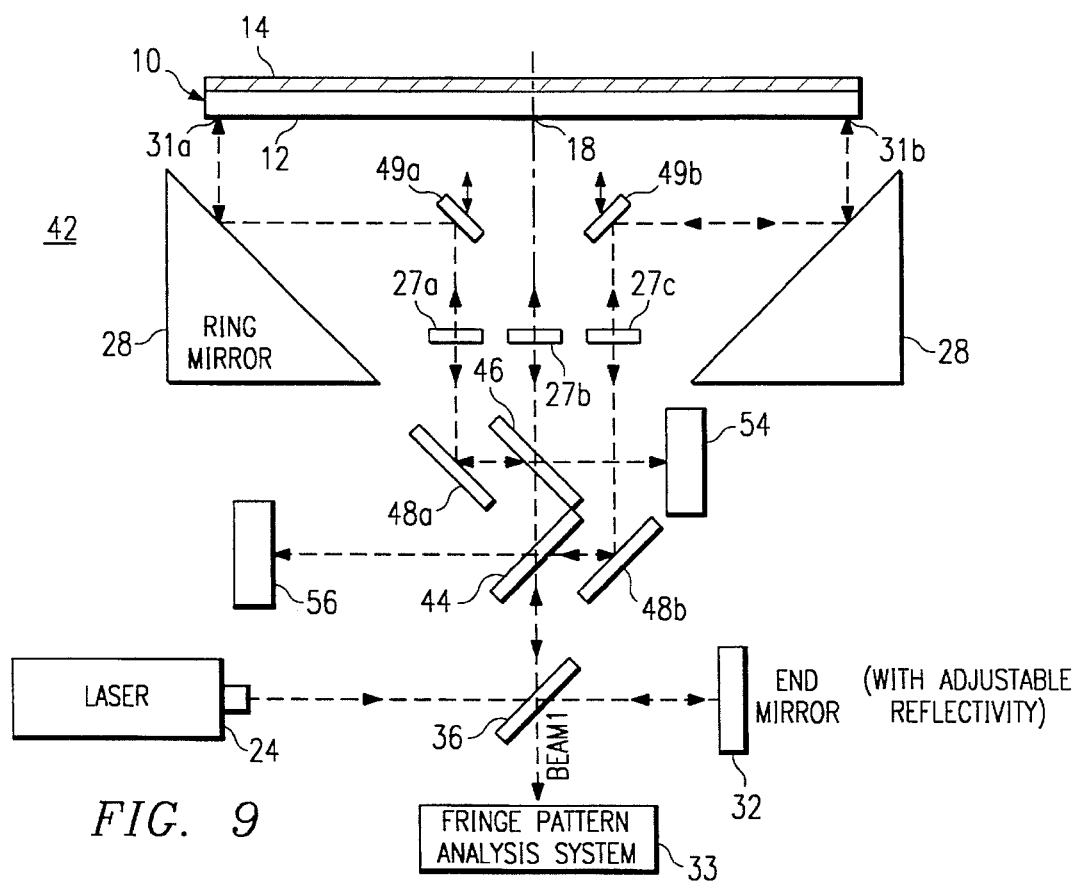
FIG. 9 is a schematic diagram of another alternative embodiment of the stress measurement and slip dislocation mapping sensor system of the present invention employing an alternate beam splitter configuration, a cone mirror, and a single laser beam split into three beams for interferometric fringe pattern analysis.

FIG. 9 depicts another embodiment of the stress measurement and slip dislocation mapping system 42. In this embodiment, an alternate beam splitter configuration is depicted along with the use of cone mirror 30. In the embodiment of FIG. 9, a portion of the beam incident on the single beam splitter 36 is directed to a pair of beam splitters 44 and 46. Beam splitters 44 and 46 together split the portion of the beam received from beam splitter 36 into 3 incident beams. One of the resulting beams travels to the center point 18 of wafer 10, while the other two beams are directed to respective edge (or off-center) points 31a and 31b of wafer 12 via flat mirrors 49a and 49b, and ring mirror 28. It is noted that flat mirrors 49a and 49b can be replaced with cone mirror 30 of FIG. 4 without deviating from the inventive concepts of the present invention. The reflected beams from center point 18 of wafer 10 and the returning reflected beams from edge points 31a and 31b are combined by beam splitters 44 and 46. The remaining portions of the reflected beams from edge points 31a and 31b are passed to blackbody absorbers 54 and 56 by beam splitters 46 and 44, respectively, and absorbed. The resulting reflected beam from the combinations performed by splitters 44 and 46 is in turn combined by beam splitter 36 with the reference reflected beam from end mirror 32. The final resulting beam, BEAM1, from beam splitter 36 is used for interferometric fringe pattern analysis by fringe pattern analysis system 33 to extract warpage and slip dislocation maps. Optional beam attenuators 27a, 27b, and 27c, with adjustable coefficients, may be used along the path of the incident and reflected beams to vary the intensity of the beams. By rotating components 44, 46, 48a, 48b, 49a, 49b, 54, 56, 27a, and 27c, and varying the height of cone mirror 30, the entire surface of wafer 10 may be scanned as shown by example traces in FIG. 5. As shown in FIG. 9, optional shutter/absorbers can be controlled by the fringe pattern analysis system to obtain various interferometric combinations of the off-center reflected beams, center reflected beams, and the reference beam reflected from the end mirror 32.

Figure 10:
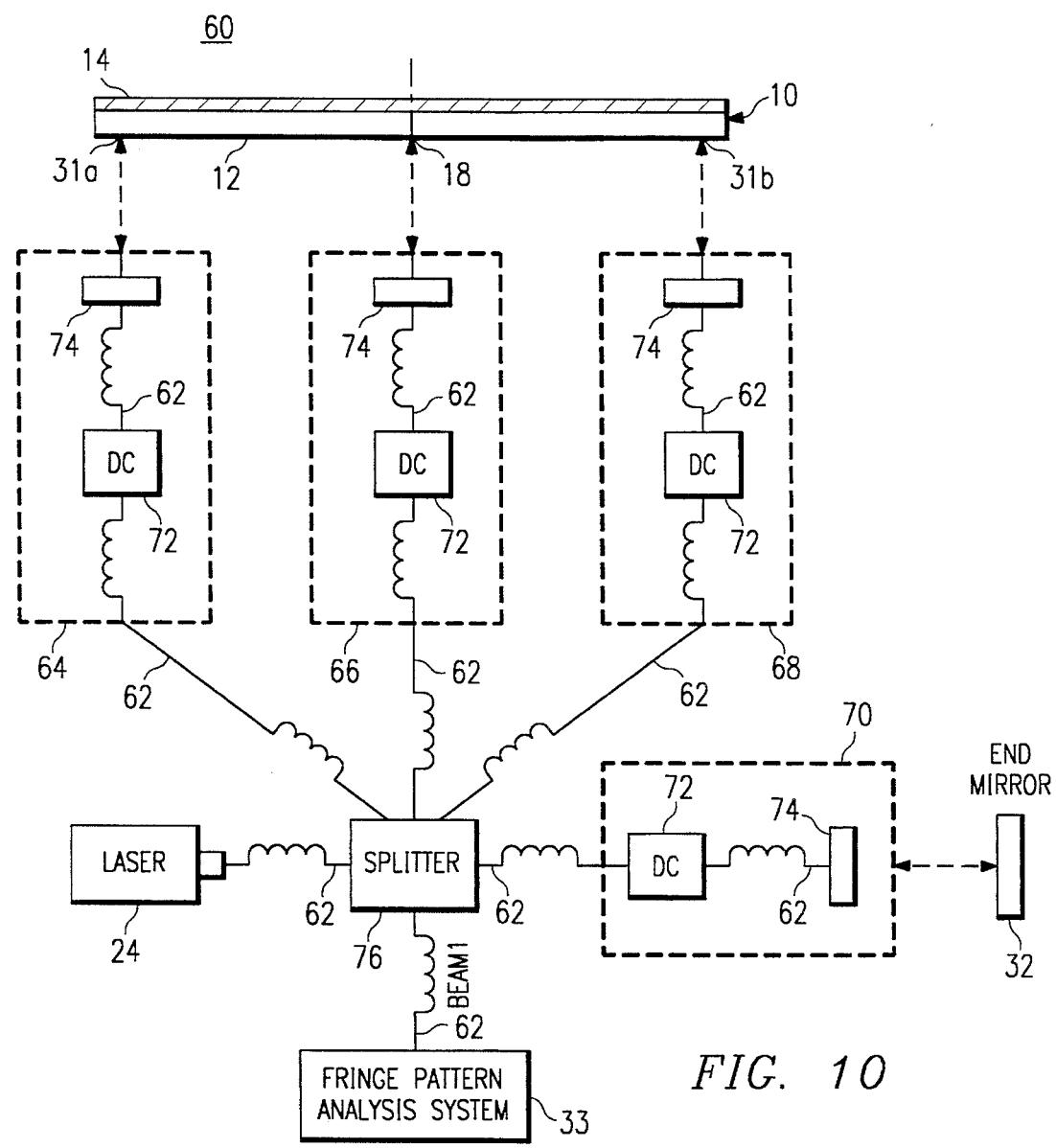
FIG. 10 is a schematic diagram of an embodiment of the stress measurement and slip dislocation mapping sensor system of the present invention employing fiber optics for transmission of the laser beams.

FIG. 10 depicts stress measurement and slip dislocation mapping system 60 implemented using optical fibers. In this embodiment, fiber optic cable 62 is used throughout system 60 to direct the beams in lieu of mirrors. The system of FIG. 10 includes four modules 64 through 70 used to direct the incident and reflected beams between splitter 76 and wafer 10 as well as end mirror 32. Module 66 directs a first beam to the center of wafer 10 and receives the reflected beam from the center of wafer 10. Module 64 directs a second beam to first edge (or off-center) point 31a on wafer 10, and director 68 directs a third beam to second edge (or off-center) point 31b. Module 70 directs a beam to end mirror 32. These modules also receive the corresponding reflected beams.

Each of the modules has the capability to direct a beam from splitter 76 to a designated point. Each module comprises directional coupler 72 and fiber termination and collimating lens 74. Directional coupler 72 controls the direction of the beam travelling in the respective module. Fiber bundles may be used in lieu of directional couplers. Lens 74 collimates or focuses the laser beam travelling in the module at the appropriate target. Lens 74 also receives the reflection from the appropriate location on wafer 10 and couples the reflection back into the module. Modules 64 through 70 all operate in the same manner.

System 60 of FIG. 10 also comprises splitter 76. Splitter 76 accepts the primary laser beam provided by laser source 24 on fiber optic cable 62, and splits the primary laser beam into four secondary laser beams that are sent on fiber-optic cables 62 to modules 64 through 70 and to the appropriate location on wafer 10. On return from modules 64 through 70, splitter 76 recombines the beam returning on module 70 with any one of or all of the returning beams on modules 64, 66 and 68. Splitter 76 provides the composite interferometric beam, BEAM1, or beams from these recombinations to interferometric fringe pattern analysis system 33. The number of modules as well as the number of interferometric beams provided to fringe pattern analysis system 33 in system 60 can be modified without affecting the inventive concept of the present invention.

Figure 11:
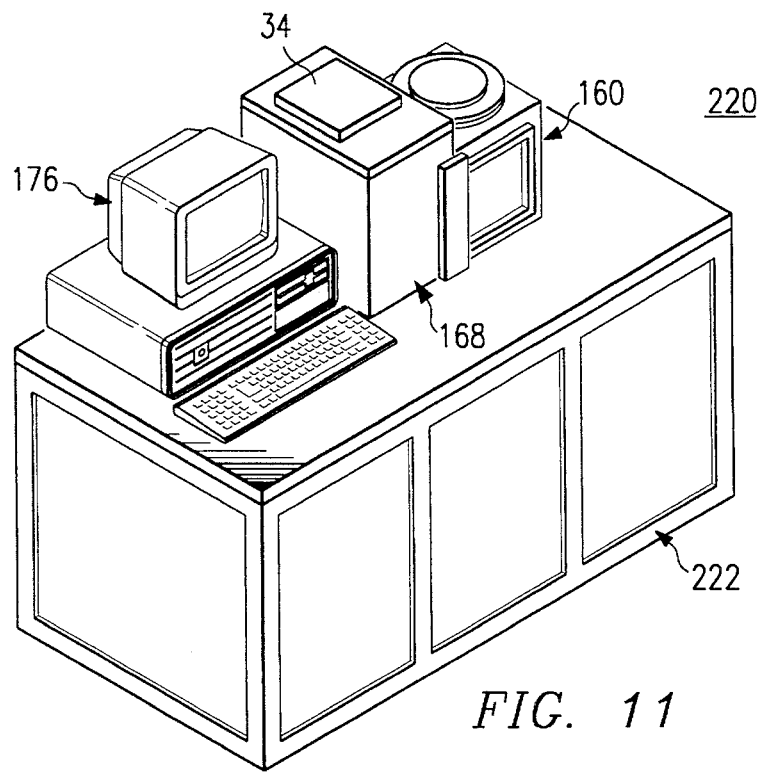
FIG. 11 depicts the stress measurement and slip dislocation mapping system of FIG. 8 integrated into an advanced vacuum processor (AVP)

FIG. 11 is a perspective view of the present invention integrated with an advanced vacuum processor (AVP) 220. AVP 220 includes load lock chamber 168, process chamber 160, and process control computer 176. Within base 222 of AVP 220 may be stored the other components of AVP 220, inlcuding, but not limited to; a gas box, power distrubution box, pumping controls, vacuum gauges, flow meters, valve controllers, and pressure gauges. Stress measurement and slip dislocation mapping sensor system 34 of FIG. 8 is shown as part of load lock chamber 168 of AVP 220.

Figure 12:
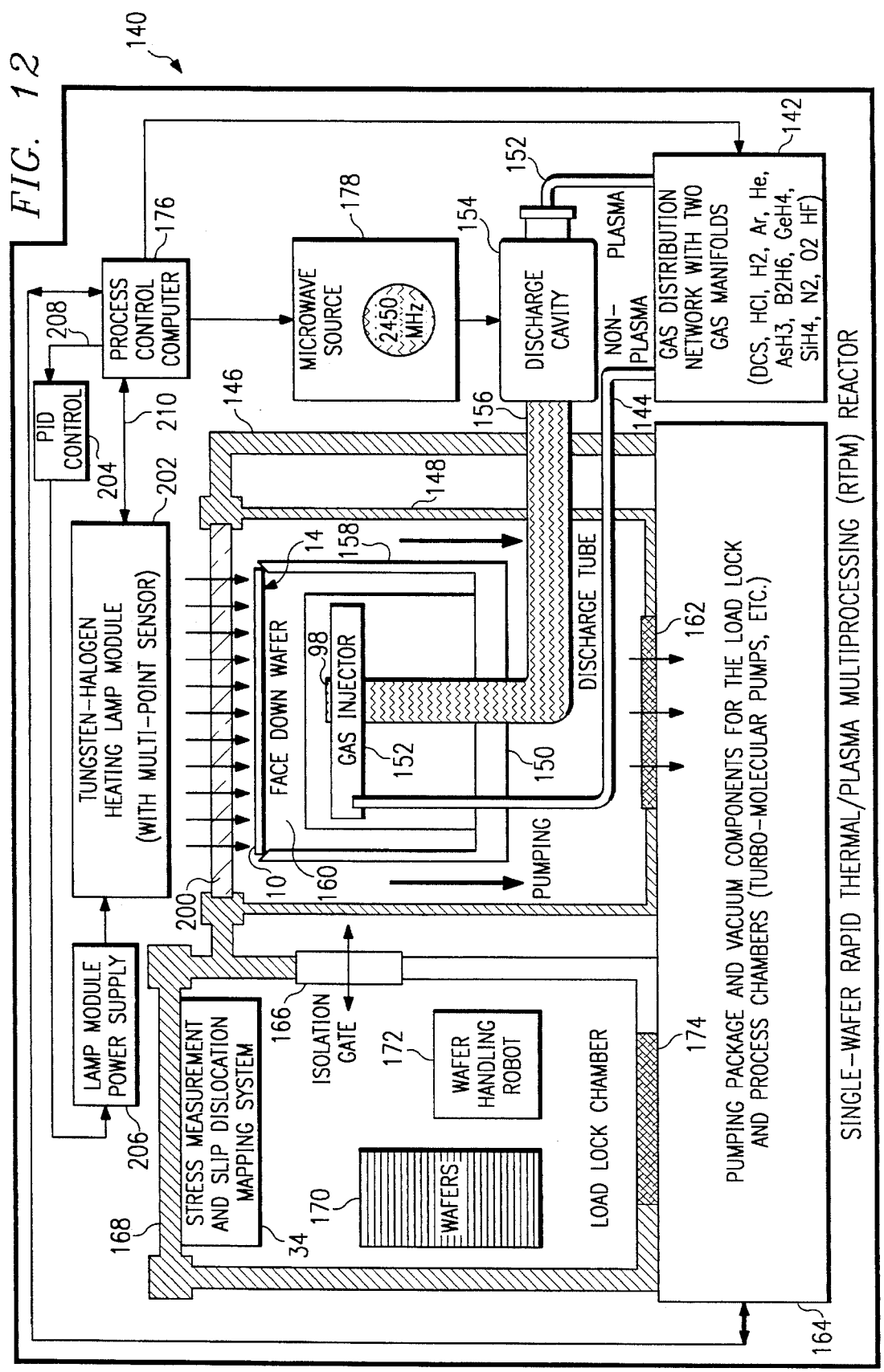
FIG. 12 depicts the stress measurement and slip dislocation mapping system of FIG. 8 integrated into a rapid thermal processing (RTP) reactor.

FIG. 12 is a schematic representation of a semiconductor fabrication reactor 140 establishing a representative single wafer environment including stress measurement and slip dislocation mapping system 34 of the present invention. Within a single wafer rapid thermal processing reactor, such as the Texas Instruments' Automated Vacuum Processor (AVP), may reside a 29 semiconductor wafer 10 for device processing. Beginning at the bottom right-hand corner of FIG. 12, gas distribution network 142 may comprise two gas manifolds: a non-plasma process gas manifold not shown and a plasma manifold. Non-plasma process gas manifold connects to a gas line 144 which penetrates through reactor casing 146 and process chamber wall 148 to proceed through ground electrode 150 and into gas injector 152. The plasma manifold connects via gas line 152 into discharge cavity 154 for generating process plasma. Process plasma-activated species pass within plasma discharge 156 through reactor casing 146 and process chamber wall 148, through ground electrode 150 and into wafer process environment. Above gas injector assembly 152, and supported by low thermal mass pins 158, appears semiconductor wafer 10. Low thermal mass pins 158 are supported by ground electrode 150 within process chamber 160. Process chamber 160 also includes optical quartz window 200 which separates semiconductor wafer 10 from tungsten-halogen heating lamp module 202.

Process chamber 160 also includes pump-down interface 162 which removes process gas and plasma into pumping package 164. Additionally, isolation gate 166 permits passage of semiconductor wafers 10 from load-lock chamber 168 into process chamber 160. To permit movement of semiconductor wafers 10 into process chamber 160, process chamber wall 148 is supported by a vertically-moving element (not explicitly shown). Within load-lock chamber 168 appears a stack of semiconductor wafers 170 from which wafer handling robot 172 removes a single semiconductor wafer 10 for processing.

To maintain load-lock chamber 168 and process chamber 160 under vacuum, load-lock chamber 168 also includes vacuum interface 174 which permits pumping package 164 to maintain a vacuum. Process control computer 176 controls the fabrication of semiconductor wafer 10 in the reactor of FIG. 12. Control signals from process control computer 176 include signals to PID temperature/lamp power controller 204. PID controller 204 provides various control signals to lamp module power supply 206. Lamp module power supply 206, in turn, provides various control signals to tungsten-halogen heating lamp module 202. Process control computer 176 also directs control vacuum setpoints to pumping packing 164 and gas and plasma inlet flow signals to gas distribution network 142. To provide proper activation of plasma species at discharge cavity 154, process control computer 176 provides a control signal to microwave source 178.

To control the input power of tungsten-halogen heating lamp module 202, process control computer 176 sends power control signals via line 208 to PID controller 204 in response to the temperature sensor outputs (received via line 210).

FIG. 12 shows that the in-situ sensor system of the present invention is noninvasive and can be easily integrated into available semiconductor processing equipment. The orientation of stress measurement and slip dislocation mapping system 34 of FIG. 8 in load lock chamber 168 relative to the stack of wafers 170 is by way of example only, and is not intended to limit the inventive concepts of the present invention. In particular, system 34 can be positioned anywhere in chamber 168 such that access to the front or backside of the individual wafers of wafer stack 170 is obtainable.

The system of the present invention provides a low-cost, noninvasive, in-situ stress measurement and slip dislocation mapping system. Although the present invention and its advantages have been described in detail, it should be understood that various changes, substitutions and alterations can be made herein without departing from the spirit and scope of the invention as defined by the appended claims.

What is claimed is:

1. A system for measurement of warpage of a semiconductor wafer in semiconductor processing equipment, comprising:

a laser source operable to provide a primary incident laser beam;

at least one beam Z-splitter operable to split the primary incident laser beam into at least first and second beams, said first beam directed to and from a first point of the surface of said wafer and said second beam directed to and from a second point of said surface of said wafer;

wherein said at least one beam splitter is further operable to combine a portion of said first beam after reflection from said first point of the wafer surface and a portion of said second beam after reflection from said second point of the wafer surface into at least one composite beam for interferometric fringe pattern analysis, wherein said fringe pattern analysis provides data for measurement of warpage of the semiconductor wafer and said at least one beam splitter is an adjustable height rotating beam splitter further operable to rotate relative to said wafer so as to trace at least one of the beams around a circumference of said surface of said wafer, said adjustable height rotating beam splitter is further operable to move in a plane perpendicular to the wafer so as to variably change the radius of circumference upon which the at least one beam is traced to enable tracing of the entire surface of said wafer.

2. A system for measurement of warpage of a semiconductor wafer in semiconductor processing equipment, comprising;

a laser source operable to provide a primary incident laser beam;

at least one beam Z-splitter operable to split the primary incident laser beam into at least first and second beams, said first beam directed to and from a first point of the surface of said wafer and said second beam directed to and from a second point of said surface of said wafer;

wherein said at least one beam splitter is further operable to combine a portion of said first beam after reflection from said first point of the wafer surface and a portion of said second beam after reflection from said second point of the wafer surface into at least one composite beam for interferometric fringe pattern analysis, wherein said fringe pattern analysis provides data for measurement of warpage of the semiconductor wafer;

at least one mirror operable to direct at least one of the beams to and from said surface of said wafer;

wherein said at said at least one beam splitter working in cooperation with said at least one mirror is further operable to rotate relative to the wafer so as to trace the at least one of the beams around a circumference of the wafer surface, said adjustable height rotating beam splitter is further operable to move in a plane perpendicular to the wafer so as to variably change the radius of circumference upon which the at least one beam is traced to enable tracing of the entire surface of said wafer.

3. A system for measurement of warpage of a semiconductor wafer in semiconductor processing equipment, comprising:

a laser source operable to provide a primary incident laser beam:

at least one beam Z-splitter operable to split the primary incident laser beam into at least first and second beams, said first beam directed to and from a first point of the surface of said wafer and said second beam directed to and from a second point of said surface of said wafer;

wherein said at least one beam splitter is further operable to combine a portion of said first beam after reflection from said first point of the wafer surface and a portion of said second beam after reflection from said second point of the wafer surface into at least one composite beam for interferometric fringe pattern analysis, wherein said fringe pattern analysis provides data for measurement of warpage of the semiconductor wafer;

at least one mirror operable to direct at least one of said beams to and from said surface of said wafer;

a rotator operable to rotate the wafer relative to said at least one beam splitter so as to trace said at least one beam around the circumference of the wafer surface; and wherein said at least one beam splitter working in cooperation with said at least one mirror is further operable to move in a plane perpendicular to the wafer so as to variably change the radius of circumference upon which the at least one beam is traced to enable tracing of the entire surface of said wafer.

4. A system for measurement of warpage of a semiconductor wafer in semiconductor processing equipment, comprising:

a laser source operable to provide a primary incident laser beam;

at least one beam Z-splitter operable to split the primary incident laser beam into at least first and second beams, said first beam directed to and from a first point of the surface of said wafer and said second beam directed to and from a second point of said surface of said wafer;

wherein said at least one beam splitter is further operable to combine a portion of said first beam after reflection from said first point of the wafer surface and a portion of said second beam after reflection from said second point of the wafer surface into at least one composite beam for interferometric fringe pattern analysis, wherein said fringe pattern analysis provides data for measurement of warpage of the semiconductor wafer;

an end mirror operable to reflect a beam; and wherein said at least one beam splitter further comprises:

a first beam splitter operable to split the primary incident beam into a reference beam directed to an end mirror and a remaining beam;

a second beam splitter operable to split the remaining beam into a first beam and a second beam, the first beam directed to a first point on the wafer surface, and the second beam directed to a second point of the wafer surface; and wherein said first and second beam splitters are further operable to combine a portion of the first and second beams after reflection from the wafer surface with a portion of the reference beam after reflection from said end mirror into at least one composite beam for interferometric fringe pattern analysis.

5. A system for measurement of warpage of a semiconductor wafer in semiconductor processing equipment, comprising:

a laser source operable to provide a primary incident laser beam;

at least one beam Z-splitter operable to split the primary incident laser beam into at least first and second beams, said first beam directed to and from a first point of the surface of said wafer and said second beam directed to and from a second point of said surface of said wafer; and wherein said at least one beam splitter is further operable to combine a portion of said first beam after reflection from said first point of the wafer surface and a portion of said second beam after reflection from said second point of the wafer surface into at least one composite beam for interferometric fringe pattern analysis, wherein said fringe pattern analysis provides data for measurement of warpage of the semiconductor wafer;

an end mirror operable to reflect a beam; and wherein said at least one beam splitter comprises:

a first beam splitter operable to split the primary incident beam into a first beam and a first remaining beam, the first beam directed to and from a first off-center point on the wafer surface;

a second beam splitter operable to split the first remaining beam into a second beam and a second remaining beam, the second beam directed to and from a center point of the wafer surface;

a third beam splitter operable to split the second remaining beam into a third beam and a reference beam, the third beam directed to and from a second off-center point on the wafer surface and the reference beam directed to and from said end mirror;

wherein said first beam splitter is further operable to combine a portion of the first beam after reflection from the first off-center point of the wafer surface with a portion of the reference beam after reflection from the end mirror into a first composite beam for interferometric fringe pattern analysis;

wherein said second beam splitter is further operable to combine a portion of the second beam after reflection from the center point of the wafer surface with a portion of the reference beam after reflection from the end mirror into a second composite beam for interferometric fringe pattern analysis; and wherein said third beam splitter is further operable to combine a portion of the third beam after reflection from the second off-center point of the wafer surface with a portion of the reference beam after reflection from the end mirror into a third composite beam for interferometric fringe pattern analysis.

6. A system for measurement of warpage of a semiconductor wafer in semiconductor processing equipment, comprising:

a laser source operable to provide a primary incident laser beam;

at least one beam Z-splitter operable to split the primary incident laser beam into at least first and second beams, said first beam directed to and from a first point of the surface of said wafer and said second beam directed to and from a second point of said surface of said wafer;

wherein said at least one beam splitter is further operable to combine a portion of said first beam after reflection from said first point of the wafer surface and a portion of said second beam after reflection from said second point of the wafer surface into at least one composite beam for interferometric fringe pattern analysis, wherein said fringe pattern analysis provides data for measurement of warpage of the semiconductor wafer;

an end mirror operable to reflect a beam; and wherein said at least one beam splitter comprises:

a first beam splitter operable to split the primary incident beam into a first reference beam and a remaining beam, the reference beam is directed to said end mirror;

a second beam splitter operable to split the first remaining beam into a second remaining beam and a first beam, the first beam directed to and from a first off-center point on the wafer surface;

a third beam splitter operable to split the second remaining beam into a second and third beam, the second beam directed to and from a center point of the wafer surface and the third beam directed to and from a second off-center point on the wafer surface; and wherein said first, second, and third beam splitters are further operable to combine a portion of the first beam after reflection from the first off-center point of the wafer surface, the second beam after reflection from the center point of the wafer surface, and the third beam after reflection from the second off-center point on the wafer surface into at least one composite beam for interferometric fringe pattern analysis.

7. A system for measurements of slip dislocation lines and their distribution in a semiconductor wafer in semiconductor processing equipment, comprising:

a photodetector;

a laser source operable to provide a primary incident beam;

at least one movable mirror operable to guide a portion of the primary incident beam to and from at least one point on the wafer surface;

wherein said movable mirror is used to scan the portion of the primary incident beam over at least a portion of the wafer surface, and the intensity of the portion of the primary incident beam reflected from the wafer surface is measured by said photodetector, the measured intensity provides a signal for detection of slip dislocation lines;

at least one beam splitter operable to split the primary incident laser beam into at least first and second beams, the first beam directed to and from a first point of the wafer surface;

wherein said at least one beam splitter is an adjustable height rotating beam splitter and working in combination with said flat and ring mirrors is further operable to rotate relative to the wafer so as to trace at least one of the secondary beams around a circumference of the wafer surface, said adjustable height rotating beam splitter is further operable to move in a plane perpendicular to the wafer so as to variably change the radius of circumference upon which the at least one secondary beam is traced to enable tracing of the entire wafer surface; and wherein said at least one beam splitter is further operable to combine a portion of the first beam after reflection from the wafer surface with a portion of the second beam after reflection from the wafer surface into at least one composite beam for interferometric fringe pattern analysis for measuring slip dislocation lines in the semiconductor wafer.

8. A system for measurements of slip dislocation lines and their distribution in a semiconductor wafer in semiconductor processing equipment, comprising:

a photodetector;

a laser source operable to provide a primary incident beam;

at least one movable mirror operable to guide a portion of the primary incident beam to and from at least one point on the wafer surface;

wherein said movable mirror is used to scan the portion of the primary incident beam over at least a portion of the wafer surface, and the intensity of the portion of the primary incident beam reflected from the wafer surface is measured by said photodetector, the measured intensity provides a signal for detection of slip dislocation lines;

at least one beam splitter operable to split the primary incident laser beam into at least first and second beams, the first beam directed to and from a first point on the wafer surface;

wherein said at least one movable mirror comprises a cone mirror and a ring mirror operable to direct at least a portion of the second beam to and from a second point of the wafer surface;

wherein said at least one beam splitter is an adjustable height rotating beam splitter and working with said cone and ring mirrors is further operable to rotate relative to the wafer so as to trace at least one of the secondary beams around a circumference of the wafer surface, said adjustable height rotating beam splitter is further operable to move in a plane perpendicular to the wafer so as to variably change the radius of circumference upon which the at least one secondary beam is traced to enable tracing of the entire wafer surface; and wherein said at least one beam splitter is further operable to combine a portion of the first beam after reflection from the wafer surface with a portion of the second beam after reflection from the wafer surface into at least one composite beam for interferometric fringe pattern analysis for measurements of slip dislocation lines in the semiconductor wafer.

* * * * *